(12) United States Patent
Nakashima et al.

(10) Patent No.: US 9,712,044 B2
(45) Date of Patent: Jul. 18, 2017

(54) POWER CONVERTER

(71) Applicant: MITSUBISHI ELECTRIC CORPORATION, Chiyoda-ku, Tokyo (JP)

(72) Inventors: Yukio Nakashima, Tokyo (JP); Takayoshi Miki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/109,070

(22) PCT Filed: Feb. 12, 2014

(86) PCT No.: PCT/JP2014/053220
§ 371 (c)(1),
(2) Date: Jun. 29, 2016

(87) PCT Pub. No.: WO2015/121931
PCT Pub. Date: Aug. 20, 2015

(65) Prior Publication Data
US 2017/0005570 A1    Jan. 5, 2017

(51) Int. Cl.
*H02M 1/32* (2007.01)
*H02M 7/5387* (2007.01)
(Continued)

(52) U.S. Cl.
CPC .............. *H02M 1/32* (2013.01); *H02M 1/08* (2013.01); *H02M 7/5387* (2013.01); *H02M 2001/0009* (2013.01); *H02P 27/06* (2013.01)

(58) Field of Classification Search
CPC ............ H02M 1/12; H02M 1/14; H02M 1/15; H02M 1/32; H02M 1/36; H02M 7/49;
(Continued)

(56) References Cited

U.S. PATENT DOCUMENTS 5,375,028 A * 12/1994 Fukunaga ............ H02H 7/1227
361/31
6,304,472 B1 * 10/2001 Nagasu ................ H02M 7/003
323/282
(Continued)

FOREIGN PATENT DOCUMENTS

JP         05-207766 A    8/1933
JP         05-207766 A    8/1993
(Continued)

OTHER PUBLICATIONS

International Search Report (PCT/ISA/210) issued on May 13, 2014, by the Japanese Patent Office as the International Searching Authority for International Application No. PCT/JP2014/053220.
(Continued)

*Primary Examiner* — Yemane Mehari
(74) *Attorney, Agent, or Firm* — Buchanan Ingersoll & Rooney PC

(57) ABSTRACT

In a power converter including at least one bridge circuit configured to have upper and lower arms in which a first power semiconductor device and a second power semiconductor device are connected in series, a first gate driving circuit that supplies a charge to the first power semiconductor device of an upper arm to drive the first power semiconductor device monitors a voltage developed by an output inductor between a connection end between the first power semiconductor device and the second power semiconductor device and a load, and performs control to protect the first power semiconductor device based on a value of the monitored voltage.

15 Claims, 8 Drawing Sheets

(51) Int. Cl.
*H02M 1/08* (2006.01)
*H02M 1/00* (2006.01)
*H02P 27/06* (2006.01)

(58) Field of Classification Search
CPC ...... H02M 7/62; H02M 7/527; H02M 7/5387; Y02B 70/126
USPC ................ 363/40, 56.02, 58, 97, 131, 136
See application file for complete search history.

(56) References Cited

U.S. PATENT DOCUMENTS 8,891,262 B2 * 11/2014 Metzler ............... H02M 1/4258
  363/15
9,197,126 B2 * 11/2015 Yamada ............. H02M 1/4208

FOREIGN PATENT DOCUMENTS

| | | |
|---|---|---|
| JP | 11-220884 A | 8/1999 |
| JP | 3454186 B2 | 7/2003 |
| JP | 2005-033678 A | 2/2005 |

OTHER PUBLICATIONS

Written Opinion (PCT/ISA/237) issued on May 13, 2014, by the Japanese Patent Office as the International Searching Authority for International Application No. PCT/JP2014/053220.

* cited by examiner

POWER CONVERTER

FIELD

The present invention relates to a power converter.

BACKGROUND

An abnormal short-circuit fault such as an excessive short-circuit current flowing through a power semiconductor device may be caused due to a failure of a peripheral component or the like in a power converter equipped with a power semiconductor device. Such a kind of power converter is required to have a function of detecting an excessive short-circuit current and safely shifting the power semiconductor device to an OFF state, thereby eliminating conduction of the short-circuit current to protect the power converter itself and a load.

As a conventional art, Patent Literature 1 listed below, for example, discloses a technique to monitor an output value of a current detector provided in a line between an inverter that is a power converter and a motor that is a load, and when determining that an excessive current flows through a power semiconductor device, to provide a turnoff instruction to the power semiconductor device.

CITATION LIST

Patent Literature

Patent Literature 1: Japanese Patent Application Laid-Open No. H11-220884

SUMMARY

Technical Problem

In general, a potential of a power semiconductor device in a power converter fluctuates greatly with a switching operation. Therefore, a signal isolator that electrically isolates signals is provided between a gate driving circuit that drives a power semiconductor device and a controller. However, provision of the signal isolator results in a problem of a delay time of signal transmission caused for the signal isolator.

For example, when the signal isolator is provided in a circuit of the above-mentioned Patent Literature 1, a delay time since the controller provides a turnoff instruction for the protection to a power semiconductor device until a gate driving circuit actually turns off the power semiconductor device turns to increase. Therefore, there is a problem in that when a short-circuit abnormality having a great time rate of change dI/dt of a short-circuit current occurs, the protecting function of the power converter is too late to prevent breakage of the power semiconductor device.

The present invention has been made in view of the above-mentioned circumstances, and its object is to provide a power converter that detects a short-circuit abnormality such as a situation in which an excessive short-circuit current flows so as to protect a power semiconductor device, and makes a delay time until conduction of the short-circuit current is eliminated to be smaller.

Solution to Problem

In order to solve the above-mentioned problems and achieve the object, the present invention provides a power converter including at least one bridge circuit configured to have upper and lower arms in which a first power semiconductor device and a second power semiconductor device are connected in series, the power converter comprising: a first gate driving circuit connected to a first control gate terminal and a first control source terminal in the first power semiconductor device, to supply a charge to the first power semiconductor device to drive; and a second gate driving circuit connected to a second control gate terminal and a second control source terminal in the second power semiconductor device, to supply a charge to the second power semiconductor device to drive, wherein a first main current source terminal of the first power semiconductor device is connected to a second main current drain terminal of the second power semiconductor device, and an end of the connection is connected to a load by an output line, and the first gate driving circuit monitors a first voltage developed by an output inductor between the connection end and the load, and performs control to protect the first power semiconductor device based on a value of the monitored voltage.

Advantageous Effects of Invention

According to the present invention, an advantageous effect is exerted in which a short-circuit abnormality can be detected to protect a power semiconductor device, and a delay time until the conduction of a short-circuit current is eliminated can be made shorter.

DESCRIPTION OF EMBODIMENTS

Hereinafter with reference to the accompanying drawings, power converters according to embodiments of the present invention will be described. The present invention is not limited to the embodiments described below.

First Embodiment

Figure 1:
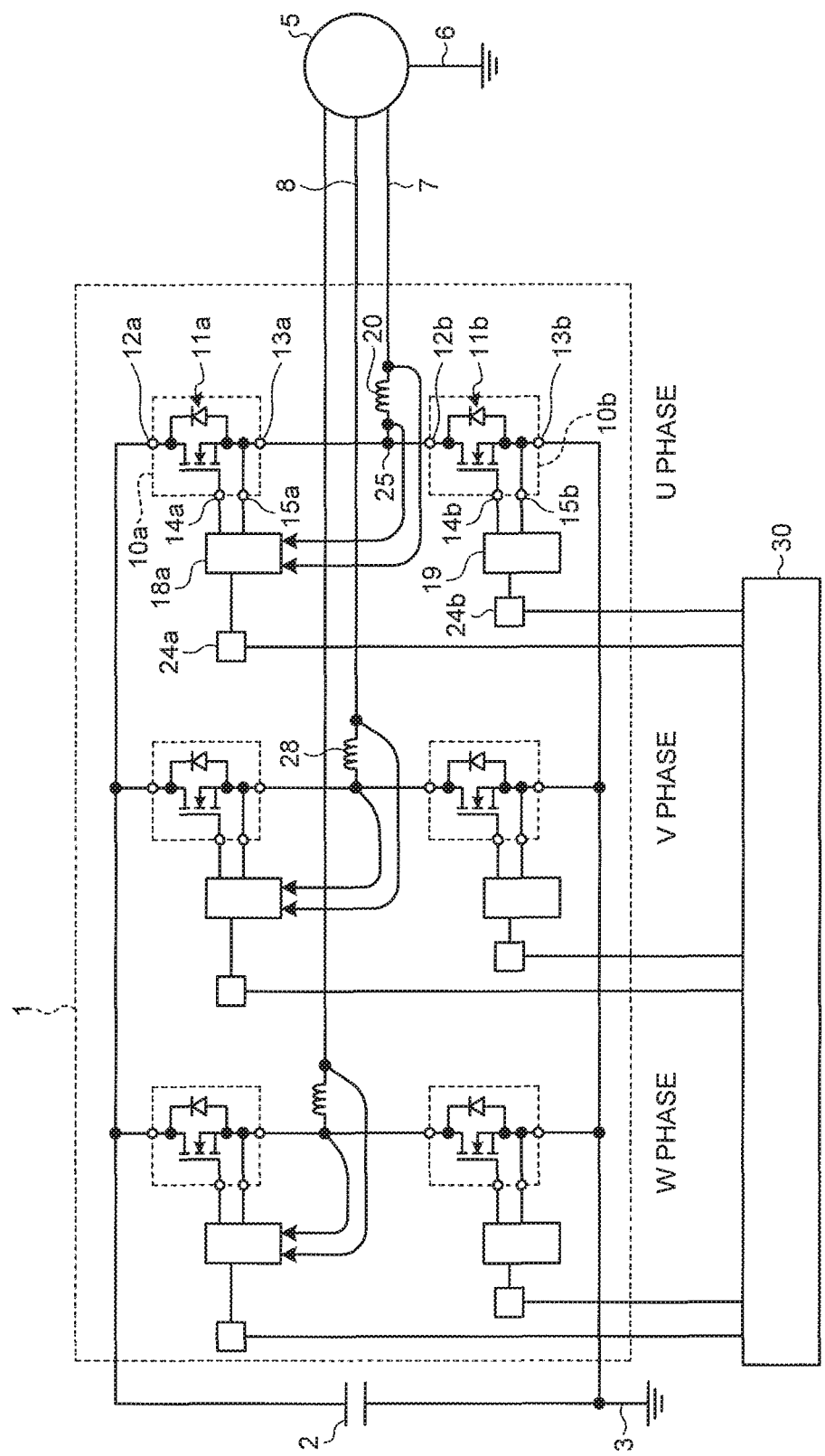
FIG. 1 is a diagram illustrating a circuit configuration of a power converter according to a first embodiment.

FIG. 1 is a diagram illustrating a circuit configuration of a power converter according to a first embodiment. A power converter 1 according to the first embodiment has a construction of three phases (U phase, V phase, W phase) connected in parallel to a direct-current capacitor 2, with a bridge circuit configured to have upper and lower arms in which power semiconductor devices each having a transistor and a freewheel diode connected in antiparallel to the transistor are connected in series, being used as a single phase. FIG. 1 illustrates a three-phase two-level circuit. The configurations of the three phases are identical or equivalent. In this sense, the present invention is not limited to three phases and two levels. For example, the present invention is applicable to a single-phase two-level circuit, and also is applicable to a circuit of a half-bridge configuration having only one bridge circuit configured to have upper and lower arms. Thus, in the following description, an explanation will be mainly made with focusing on the U phase.

A first power semiconductor device 11a constituting a U-phase upper arm and a second power semiconductor device 11b constituting a U-phase lower arm are connected in series, and are connected to the direct-current capacitor 2. The first and second power semiconductor devices (11a, 11b) are each configured to be sealed in a casing as the so-called 1 in 1 module. A 1 in 1 module 10a in which the first power semiconductor device 11a is sealed has at least four terminals, specifically, a first main current drain terminal 12a, a first main current source terminal 13a, a first control gate terminal 14a and a first control source terminal 15a. A 1 in 1 module 10b in which the second power semiconductor device 11b is sealed has the same concept, and is provided with a second main current drain terminal 12b, a second main current source terminal 13b, a second control gate terminal 14b and a second control source terminal 15b.

A connection end 25 between the first main current source terminal 13a of the first power semiconductor device 11a and the second main current drain terminal 12b of the second power semiconductor device 11b is coupled to an induction motor 5 as a load through a U-phase output line 7. A casing of the induction motor 5 is grounded via a ground line 6 in terms of safety. The negative electrode side of the direct-current capacitor 2 is also grounded via a ground line 3.

A U-phase output inductor 20 is illustrated between the connection end 25 and the induction motor 5. The U-phase output inductor 20 may be an inductor that has an inductance component, and may be a wire-wound reactor with a core or a wire-wound reactor without a core. Alternatively, the U-phase output inductor 20 may be a parasitic inductance of the U-phase output line 7. In this case, time and effort to prepare a coil separately and connect it can be eliminated.

A first gate driving circuit 18a is coupled to the first control gate terminal 14a and the first control source terminal 15a in the first power semiconductor device 11a, and supplies an electrical charge to the first power semiconductor device 11a to drive the first power semiconductor device 11a.

A second gate driving circuit 19 is connected to the second control gate terminal 14b and the second control source terminal 15b in the second power semiconductor device 11b, and supplies an electrical charge to the second power semiconductor device 11b to drive the second power semiconductor device 11b.

The first main current drain terminal 12a of the first power semiconductor device 11a is connected to a positive electrode of the direct-current capacitor 2. The second main current source terminal 13b of the second power semiconductor device 11b is connected to a negative electrode of the direct-current capacitor 2. The first power semiconductor device 11a and the second power semiconductor device 11b are turned on alternately to perform the so-called switching operation.

When the first power semiconductor device 11a is on and the second power semiconductor device 11b is off, a potential of the positive electrode of the direct-current capacitor 2 can be supplied to the induction motor 5 through the U-phase output line 7. When the first power semiconductor device 11a is off and the second power semiconductor device 11b is on, a potential of the negative electrode of the direct-current capacitor 2 can be supplied to the induction motor 5 through the U-phase output line 7.

By driving the power semiconductor devices in the U phase, the V phase and the W phase appropriately, the potential supplied from the power converter 1 to the induction motor 5 can be changed, and a rotation speed and a rotation torque of the induction motor 5 can be controlled.

A controller 30 generates control signals to drive the power semiconductor devices. In the U phase, for example, control signals outputted from the controller 30 are isolated by signal isolators 24a and 24b, and transmitted to the first gate driving circuit 18a and the gate driving circuit 19, respectively.

Here, the reason why the signal isolators are necessary will be described. For example, the first gate driving circuit 18a is connected to the first control source terminal 15a of the first power semiconductor device 11a, and the potential of the first gate driving circuit 18a is equal to that of the first control source terminal 15a of the first power semiconductor device 11a.

As described above, when the first power semiconductor device 11a is on and the second power semiconductor device 11b is off, the first main current source terminal 13a of the first power semiconductor device 11a is equal in potential to the positive electrode of the direct-current capacitor 2. Thus the potential of the first gate driving circuit 18a is approximately equal to the potential of the positive electrode of the direct-current capacitor 2. However, a control signal cannot be transmitted directly from the controller 30 to the first gate driving circuit 18a being at a high potential. Therefore, the signal isolator 24a for isolating the control signal is required.

On the other hand, since the second main current source terminal 13b of the second power semiconductor device 11b is equal in potential to the negative electrode of the direct-current capacitor 2 at all times, the potential of the gate driving circuit 19 is also approximately equal to the potential of the negative electrode of the direct-current capacitor 2. That is, unlike the first gate driving circuit 18a, the gate driving circuit 19 is at a low potential, and thus a control signal can be directly transmitted from the controller 30.

However, due to the switching operation of the second power semiconductor device 11b, a switching current may flow through a parasitic resistive component, and the potential of the second main current source terminal 13b of the second power semiconductor device 11b may fluctuate, and there may be a case where the time rate of change of the potential is significantly high. Thus, in order to prevent a malfunction of the controller 30, it is a preferable implementation mode to provide the signal isolator 24b also for the gate driving circuit 19.

The signal isolators 24a and 24b, in exchange for high isolation properties, have characteristics of delaying signal transmission since they convert electrical signals from the controller 30 for shaping processing.

In the circuit in the first embodiment illustrated in FIG. 1, the U-phase output inductor 20 and the first gate driving circuit 18a are connected without the intervention of the signal isolator 24a, and the first gate driving circuit 18a monitors a voltage developed across the U-phase output inductor 20.

Typically, the number of revolutions of the induction motor 5 is about 1 Hz to 100 Hz, and at the fastest, in the order of 1 kHz or 10 kHz. Thus, a frequency of the alternating current that the power converter 1 supplies to the induction motor 5 is typically about 1 Hz to 100 Hz, and at the fastest, in the order of 1 kHz or 10 kHz. Since the time rate of change of the current is gentle, a large voltage due to an inductance component is not considered to be developed across the U-phase output inductor 20.

Next, consider a case where an isolation failure occurs in the induction motor 5, for example, and the U-phase output line 7 and the casing of the induction motor 5 suffer short-circuit faults at low impedance. At this time, a short-circuit current flows by a route of the positive electrode of the direct-current capacitor 2→the first power semiconductor device 11*a*→the U-phase output inductor 20→the U-phase output line 7→the casing of the induction motor 5→the ground line 6→the ground→the ground line 3→the negative electrode of the direct-current capacitor 2. Since this type of short-circuit current increases in current value in a short period of time, it is necessary to detect a short-circuit abnormality at an early stage, and provide a turnoff instruction to the first power semiconductor device 11*a* to eliminate the conduction of the short-circuit current.

In the circuit configuration in FIG. 1, when a short-circuit fault occurs, a large voltage due to inductance is developed in the U-phase output inductor 20. The first gate driving circuit 18*a* monitors the voltage developed across the U-phase output inductor 20, thereby detecting an abnormality and turning off the first power semiconductor device 11*a*. The first power semiconductor device 11*a* is turned off immediately when an abnormality is detected since the signal isolator 24*a* having the characteristics of delaying signal transmission does not intervene. By doing so, it is possible to shorten the delay time until the conduction of a short-circuit current is eliminated. Also in the V phase and the W phase, the same circuit configuration is used. Thus as for short-circuit currents generated in the V phase and the W phase, the conduction of the short-circuit currents can be eliminated in a short period of time.

The same applies when an isolation failure occurs in the induction motor 5 and the U-phase output line 7 and the V-phase output line 8 suffer short-circuit faults at low impedance. Or the same applies when the U-phase output line 7 and the V-phase output line 8 are broken down in isolation, and suffer short-circuit faults at low impedance. In these cases, a short-circuit current flows by a route of the positive electrode of the direct-current capacitor 2→the first power semiconductor device 11*a* in the U phase→the U-phase output inductor 20→the U-phase output line 7→the V-phase output line 8→a V-phase output inductor 28→a second power semiconductor device 11*b* in the V phase→the negative electrode of the direct-current capacitor 2.

The first gate driving circuit 18*a* in the U phase monitors the voltage developed across the U-phase output inductor 20, thereby detecting an abnormality and turning off the first power semiconductor device 11*a*. A first gate driving circuit 18*a* in the V phase monitors the voltage in the V-phase output inductor 28, thereby detecting an abnormality and turning off a first power semiconductor device 11*a* in the V phase. The delay time since an abnormality is detected until the first power semiconductor device 11*a* is turned off and the conduction of a short-circuit current is eliminated can be shortened since a signal isolator having the characteristics of delaying signal transmission does not intervene.

As is clear from the above description, the circuit configuration in the first embodiment, as long as an abnormality is a short-circuit abnormality of a short-circuit current flowing through an output reactor, can deal with occurrence of any short-circuit abnormality, and allows transmission of a signal indicating a short-circuit abnormality to be performed immediately to turn off a power semiconductor device, thereby making it possible to shorten the delay time until the conduction of a short-circuit current is eliminated.

Figure 2:
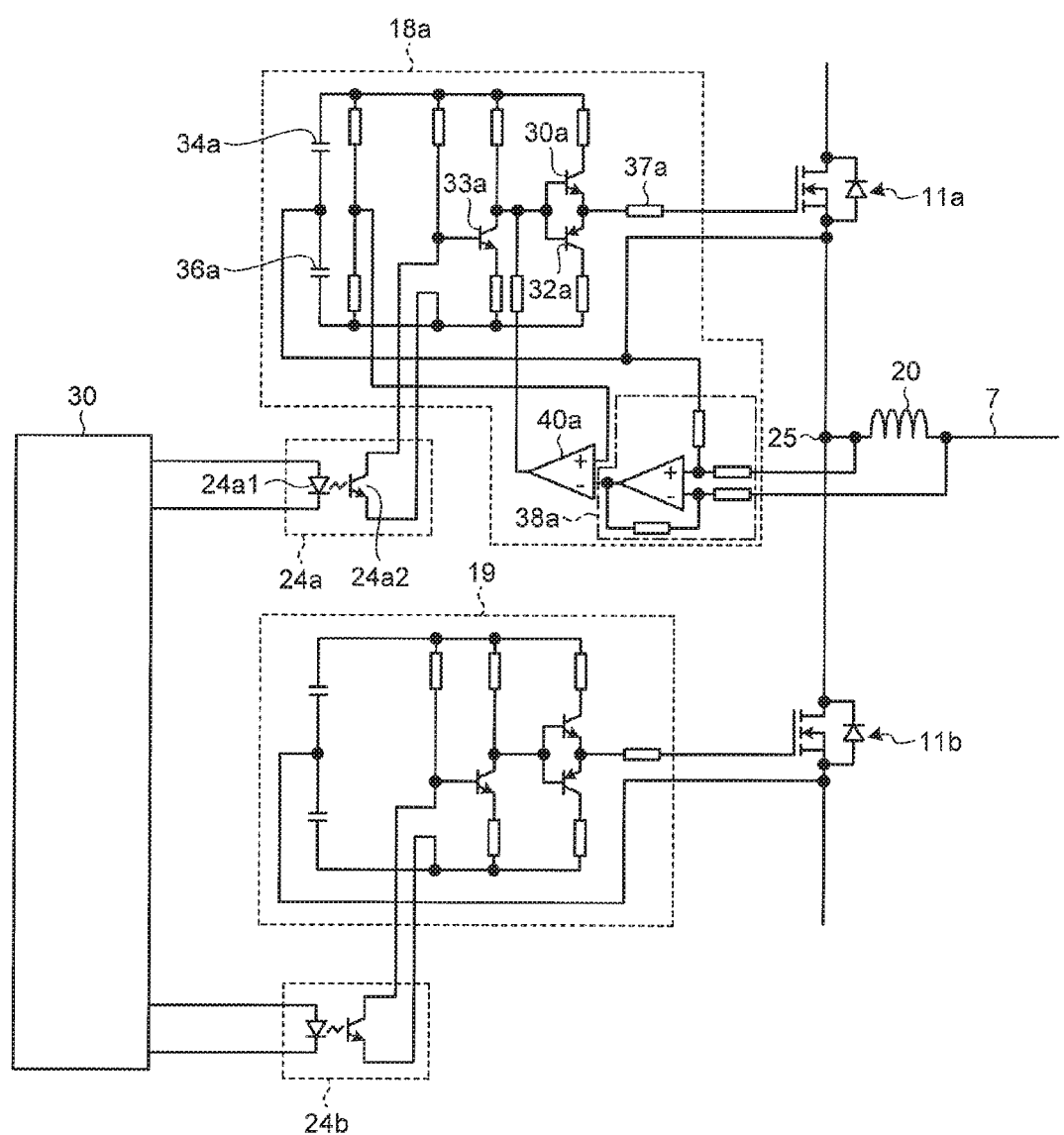
FIG. 2 is a diagram illustrating a detailed circuit configuration of a first gate driving circuit according to the first embodiment.

Next, the first gate driving circuit 18*a* according to the first embodiment will be described. FIG. 2 is a diagram illustrating a detailed circuit configuration of the first gate driving circuit 18*a*, and also illustrates connections to a power semiconductor device and an output inductor that are peripheral circuit components. The gate driving circuit 19 is a generally used gate driving circuit for controlling the drive of the second power semiconductor device 11*b*.

In the first gate driving circuit 18*a*, an on capacitor 34*a* is connected on the upper-level side and an off capacitor 36*a* is connected on the lower-level side. A point of connection between the on capacitor 34*a* and the off capacitor 36*a* is connected to the first control source terminal 15*a* of the first power semiconductor device 11*a*. Based on a technique publicly known to those skilled in the art such a radio frequency pulse transformer or main circuit feeding, the on capacitor 34*a* and the off capacitor 36*a* are supplied with a charge and controlled to have a fixed voltage.

The positive electrode of the on capacitor 34*a* is connected to a control gate terminal of the first power semiconductor device 11*a* via an on transistor 30*a* and a gate resistor 37*a*. The negative electrode of the off capacitor 36*a* is connected to the control gate terminal of the first power semiconductor device 11*a* via an off transistor 32*a* and the gate resistor 37*a*. The on transistor 30*a* and the off transistor 32*a* are turned on alternately.

When the on transistor 30*a* is turned on, a circuit is formed having a path of the positive electrode of the on capacitor 34*a*→the on transistor 30*a*→the gate resistor 37*a*→the control gate terminal of the first power semiconductor device 11*a*→the first control source terminal 15*a* of the first power semiconductor device 11*a*→the negative electrode of the on capacitor 34*a*. This operation allows a positive bias corresponding to the voltage of the on capacitor 34*a* to be applied between the first control gate terminal 14*a* and the first control source terminal 15*a* of the first power semiconductor device 11*a*, and so the first power semiconductor device 11*a* is brought into an on state.

On the other hand, when the off transistor 32*a* is turned on, a circuit is formed having a path of the negative electrode of the off capacitor 36*a*→the off transistor 32*a*→the gate resistor 37*a*→the control gate terminal of the first power semiconductor device 11*a*→the first control source terminal 15*a* of the first power semiconductor device 11*a*→the positive electrode of the off capacitor 36*a*. A negative bias corresponding to the voltage of the off capacitor 36*a* can be applied between the first control gate terminal 14*a* and the first control source terminal 15*a* of the first power semiconductor device 11*a*, and so the first power semiconductor device 11*a* is brought into an off state.

The above-described configuration is one of examples of the configuration of the gate driving circuit. The examples include a configuration example where a location of the gate resistor is changed and also a configuration example in which MOSFETs are used instead of bipolar transistors. In any case, the first gate driving circuit 18*a* is connected to the first control source terminal 15*a* of the first power semiconductor device 11*a*, and the potential of the first gate driving circuit 18*a* is equal to the potential of the first control source terminal 15*a* of the first power semiconductor device 11*a*.

The signal isolators 24a and 24b are typically configured to use components called the so-called photocouplers. For example, in FIG. 2, a primary side of the photocoupler in the signal isolator 24a is constructed of a photodiode 24a1. The photodiode 24a1 receives an electrical signal for driving the first power semiconductor device 11a from the controller 30. The photodiode 24a1 blinks to convert the electrical signal into an optical signal. The secondary side of the photocoupler is constructed of a phototransistor 24a2. The phototransistor 24a2 receives the optical signal of the photodiode 24a1 to switch between a state of conduction between secondary-side terminals and a state of non-conduction between the secondary-side terminals. That is, the phototransistor 24a2 converts the optical signal into an electrical signal. The secondary side of the signal isolator 24a is connected to the first gate driving circuit 18a to transmit the electrical signal to the first gate driving circuit 18a. In this way, the photocoupler constituting the signal isolator 24a transmits a signal while isolating the potential of the controller 30 from the potential of the first gate driving circuit 18a by using an optical signal.

Although the signal isolator 24a has been explained as a device using an optical signal in the above description, a device using an electric field signal may be used or a device using a magnetic signal may be used since use of a signal other than an electrical signal allows isolation.

However, the signal isolator 24a, in exchange for high isolation properties, has characteristics of delaying signal transmission since it converts an electrical signal from the controller 30 for shaping processing thereof, as described above.

One of the main points of the present invention is that both ends of the U-phase output inductor 20 are connected to the first gate driving circuit 18a without the intervention of the signal isolator 24a. As described above, typically, when the power converter 1 drives the induction motor 5, a large voltage due to an inductance component is not developed across the U-phase output inductor 20. On the other hand, when a short-circuit abnormality occurs and a short-circuit current flows in a path through the U-phase output inductor 20, a voltage due to an inductance component is developed across the U-phase output inductor 20. Therefore, using the voltage developed across the U-phase output inductor 20 allows detection of a short-circuit abnormality.

By adjusting the inductance value of the U-phase output inductor 20, the magnitude of the value of the voltage generated can be adjusted. In any case, the voltage developed in the U-phase output inductor 20 is not a high voltage, and the both ends of the U-phase output inductor 20 can be connected to the first gate driving circuit 18a without the intervention of the signal isolator 24a.

The first gate driving circuit 18a processes the voltage developed across the U-phase output inductor 20 by a differential amplification circuit 38a using an operational amplifier. The larger the voltage developed across the U-phase output inductor 20 is, the larger the amount of change in the output voltage of the differential amplification circuit 38a becomes.

A comparator 40a receives the output voltage of the differential amplification circuit 38a and compares it to a reference voltage. With this configuration, when the voltage developed across the U-phase output inductor 20 exceeds a preset threshold voltage, the output of the comparator 40a changes from "High" to "Low." The output of the comparator 40a is connected to a transistor 33a that drives the on transistor 30a and the off transistor 32a of the first gate driving circuit 18a. When the output of the comparator 40a changes from "High" to "Low," the on transistor 30a is turned off and the off transistor 32a is turned off, irrespective of whether a signal from the controller 30 is an on instruction or an off instruction. That is, the first power semiconductor device 11a is controlled to be off irrespective of whether the signal from the controller 30 is an on instruction or an off instruction. In this way, the first power semiconductor device 11a can be controlled from the detection of the voltage across the U-phase output inductor 20 to the power semiconductor device without the intervention of the signal isolator 24a having the characteristics of delaying signal transmission, so that the delay time between detection of an abnormal short-circuit and turnoff of the first power semiconductor device 11a can be shortened.

As described above, according to the power converter in the first embodiment, in a power converter having at least one bridge circuit configured to have upper and lower arms in which a first power semiconductor device and a second power semiconductor device are connected in series, a first gate driving circuit that supplies a charge to the first power semiconductor device of the upper arm to drive the device monitors a voltage developed by an output inductor between a connection end between the first power semiconductor device and the second power semiconductor device, and a load, and performs control to protect the first power semiconductor device based on a value of the monitored voltage. By so doing, it is possible to achieve an effect of allowing a short-circuit abnormality such as the flow of an excessive short-circuit current to be detected to protect the first power semiconductor device, and allowing a delay time until the conduction of a short-circuit current is eliminated, to be made shorter.

By configuring the first gate driving circuit using a differential amplifier and inputting the voltage developed across the output inductor to the differential amplifier, a value of a current flowing through an output line can be estimated, and based on the estimated current value, the control to protect the first power semiconductor device can be performed.

Second Embodiment

Figure 3:
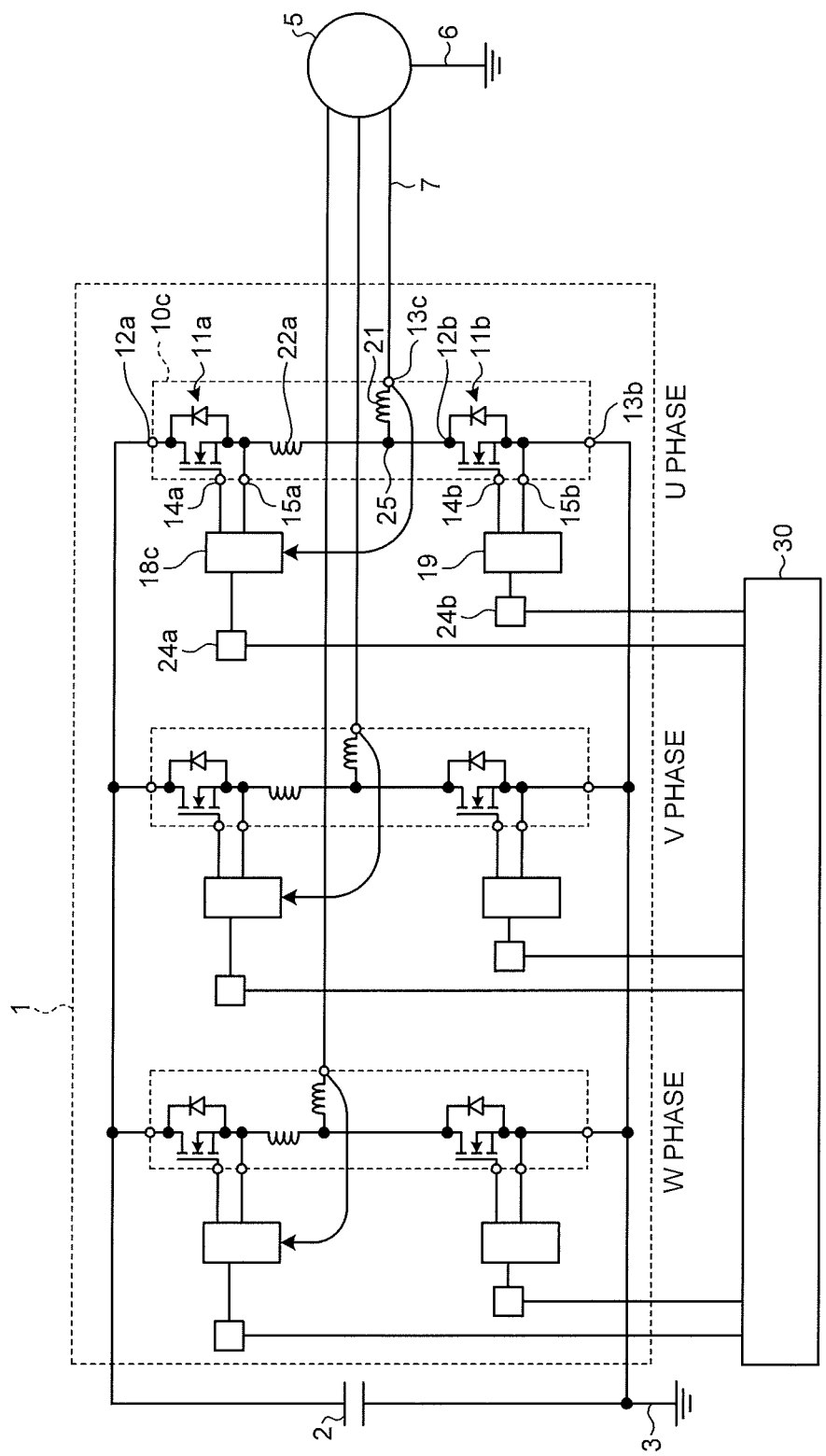
FIG. 3 is a diagram illustrating a circuit configuration of a power converter according to a second embodiment.

FIG. 3 is a diagram illustrating the circuit configuration of a power converter according to a second embodiment. Differences of the power converter according to the second embodiment from that in the first embodiment are, as illustrated in FIG. 3, that the voltage across a U-phase output inductor is not taken in but a potential of the U-phase output inductor is taken in with a potential of the first control source terminal 15a in the first power semiconductor device 11a being used as a reference, and that the first power semiconductor device 11a and the second power semiconductor device 11b are configured to be sealed in a single casing as the so-called 2 in 1 module. Identical or equivalent components to those in the first embodiment illustrated in FIG. 1 are denoted by the same reference symbols, and redundant details are omitted as appropriate.

The first power semiconductor device 11a constituting a U-phase upper arm and the second power semiconductor device 11b constituting a U-phase lower arm are connected in series, and connected to a direct-current capacitor 2. The first power semiconductor device 11a and the second power semiconductor device 11b are configured to be both sealed in a single casing as the so-called 2 in 1 module. A 2 in 1 module 10c in which the first power semiconductor device 11a and the second power semiconductor device 11b are sealed is provided with at least seven terminals, specifically, a first main current drain terminal 12a, a first control gate terminal 14a, a first control source terminal 15a, a second main current source terminal 13b, a second control gate terminal 14b, a second control source terminal 15b, and a load connection terminal 13c.

The first control source terminal 15a of the first power semiconductor device 11a and a connection end 25 between the first power semiconductor device 11a and the second power semiconductor device 11b located inside the 2 in 1 module 10c are connected to an induction motor 5 as a load through a U-phase output line 7 connected to the load connection terminal 13c.

A U-phase output inductor 21 is illustrated between the connection end 25 and the load connection terminal 13c, and a first inductor 22a is illustrated between the first control source terminal 15a of the first power semiconductor device 11a and the connection end 25. In this embodiment, for the U-phase output inductor 21 and the first inductor 22a, the parasitic inductance inherent in wiring lines in the module is used. Using parasitic inductance has an advantage of eliminating the need to provide coils individually.

A first gate driving circuit 18c is connected to the first control gate terminal 14a and the first control source terminal 15a in the first power semiconductor device 11a, and supplies a charge to the first power semiconductor device 11a to drive the first power semiconductor device 11a.

Figure 4:
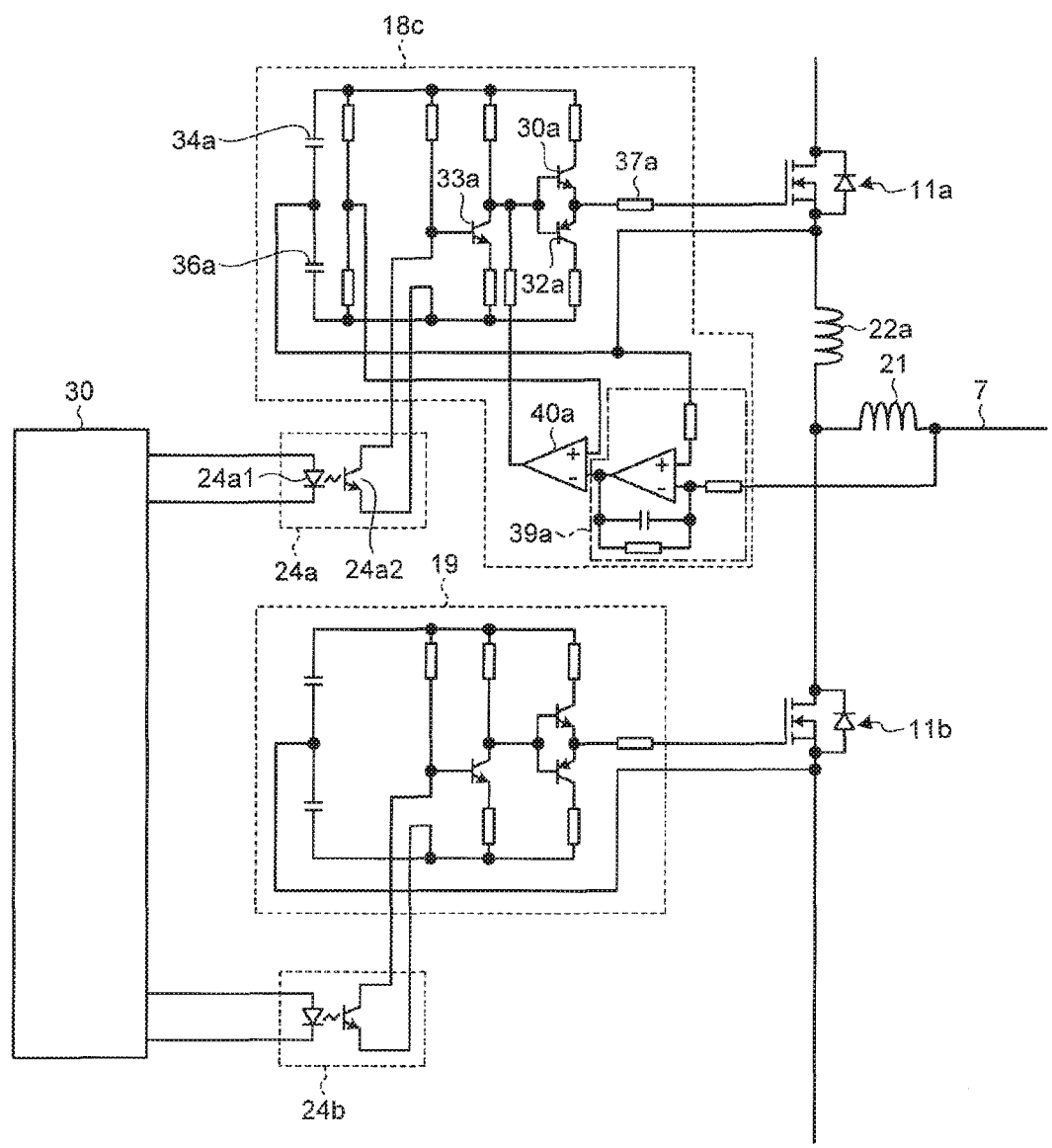
FIG. 4 is a diagram illustrating a detailed circuit configuration of a first gate driving circuit according to the second embodiment.

FIG. 4 is a diagram illustrating a detailed circuit configuration of the first gate driving circuit 18c according to the second embodiment. FIG. 4 also illustrates connections to the first power semiconductor device 11a that is a peripheral circuit component, and the U-phase output inductor 21 and the first inductor 22a that are circuit elements in combination therewith. A difference from the first gate driving circuit 18a illustrated in FIG. 2 is that instead of the voltage across the U-phase output inductor 21 corresponding to the configuration in FIG. 4, a potential of the load-side end of the U-phase output inductor 21 and a potential of the first control source terminal 15a of the first power semiconductor device 11a are inputted to the circuit 18c. It may be rephrased that the voltage across the U-phase output inductor 21 and first inductor 22a is inputted to this configuration. The gate driving circuit 19 is a commonly used gate driving circuit for controlling the drive of the second power semiconductor device 11b.

The first gate driving circuit 18c processes the voltage developed across the U-phase output inductor 21 and first inductor 22a by a time integration circuit 39a using an operational amplifier. Since the voltage developed across the U-phase output inductor 21 and first inductor 22a represents a time rate of change in the flowing current, an output of the time integration circuit 39a represents a value of a current flowing through both the U-phase output inductor 21 and the first inductor 22a (flowing current value).

That is, the first gate driving circuit 18c can know a value of a current flowing through the U-phase output inductor 21 and first inductor 22a, and can perform abnormality determination and protection control based on the current value.

The output of the time integration circuit 39a is inputted to a comparator 40a. The comparator 40a receives the output voltage of the time integration circuit 39a, and compares it to a reference voltage. An operation after that is the same as that in the first embodiment illustrated in FIG. 2. Specifically, when a short-circuit abnormality is detected based on the voltage across the U-phase output inductor 21 and first inductor 22a, the first power semiconductor device 11a is controlled to be off irrespective of whether a signal from the controller 30 is an on instruction or an off instruction.

As described above, according to the power converter of the second embodiment, in a power converter having at least one bridge circuit configured to have upper and lower arms in which a first power semiconductor device and a second power semiconductor device are connected in series, a first gate driving circuit that supplies a charge to the first power semiconductor device of an upper arm to drive the device monitors a third voltage representing a total value of a first voltage developed by a first inductor between a connection end between the first power semiconductor device and the second power semiconductor device, and a first main current source terminal, and a second voltage developed by an output inductor between the connection end and a load, and performs control to protect the first power semiconductor device based on a value of the monitored voltage. Accordingly, an advantageous effect is exerted in which a short-circuit abnormality such as the flow of an excessive short-circuit current can be detected to protect the first power semiconductor device, and a delay time until the conduction of a short-circuit current is eliminated can be made shorter.

Although the third voltage representing the total value of the first voltage developed by the first inductor and the second voltage developed by the output inductor is monitored in the second embodiment as described above, the first voltage and the second voltage may be monitored separately. Compared to the case where the third voltage representing the total value of the first voltage and the second voltage is monitored, there is a disadvantage of increased connections to the first gate driving circuit, but by monitoring the first voltage and the second voltage separately, their respective voltage values can be checked and evaluated separately, providing an advantage of facilitating distinction among short-circuit abnormality situations.

It is preferable to time-integrate the third voltage representing the total value of the first voltage developed by the first inductor and the second voltage developed by the output inductor. The time-integration of the third voltage representing a dI/dt component allows estimation of a value of the current, thus providing an advantage of allowing protection focusing on the current value.

Further, in the power converter according to the second embodiment, the first voltage developed at the first inductor between the first power semiconductor device and the second power semiconductor device is used to determine a short-circuit abnormality, thus allowing detection of even a short-circuit abnormality by which a short-circuit current flows between the first power semiconductor device and the second power semiconductor device.

Furthermore, the power converter according to the second embodiment has an advantage of eliminating the need to provide an output reactor separately since the inherent parasitic inductance of the wiring line inside the casing can be used. This implementation form can be easily and simply realized by using a 2 in 1 module.

Although FIG. 3 illustrates connections in a 2 in 1 module, the same wiring is also possible in a 1 in 1 module. In a 1 in 1 module, a parasitic inductance of wiring lines outside a casing thereof can be used.

Although the second embodiment illustrates the implementation form of using the parasitic inductance of the wiring lines inside the casing as the U-phase output inductor 21, instead of inputting the potential at the load connection terminal 13c to the first gate driving circuit 18c, input may be made from any point on the U-phase output wiring line 7 closer to the load side than the load connection terminal 13c. In this case, as the U-phase output inductor 21, not only a parasitic inductance component of internal wiring lines but also a parasitic inductance component of external wiring lines can be used, thus providing an advantageous effect of making is possible to increase the voltage developed at a detected part.

As the U-phase output inductor 21, in place of the parasitic inductance components of internal wiring lines and external wiring lines, or in place of the parasitic inductance component of external wiring lines, a substantial output reactor such as a wire-wound reactor may be used. Using a substantial wire-wound reactor can increase a value of a voltage generated, providing an advantageous effect of facilitating design of the first gate driving circuit.

Third Embodiment

Figure 5:
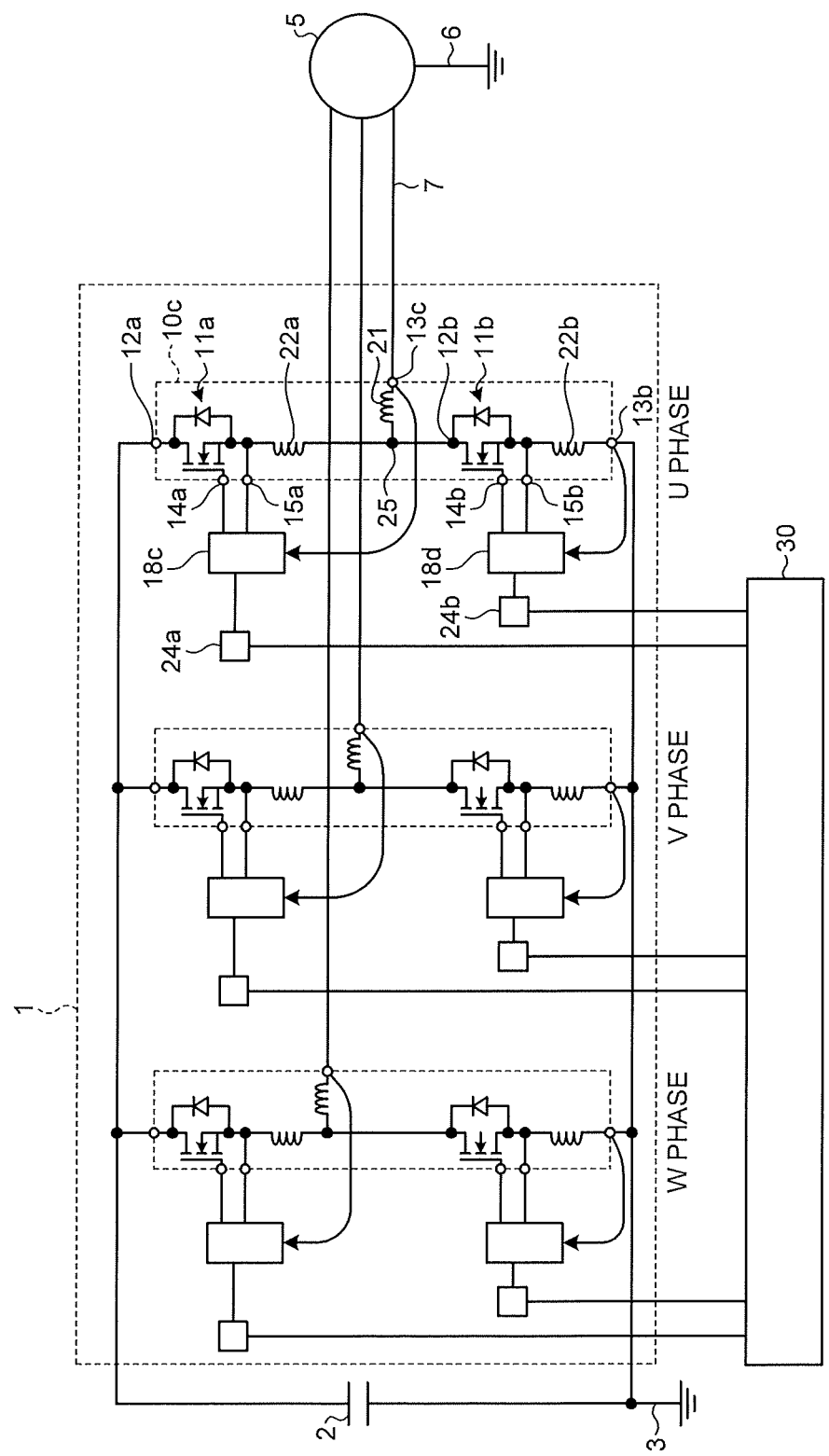
FIG. 5 is a diagram illustrating a circuit configuration of a power converter according to a third embodiment.

FIG. 5 is a diagram illustrating the circuit configuration of a power converter according to a third embodiment. A difference of the power converter according to the third embodiment from that in the second embodiment is, as illustrated in FIG. 5, that a voltage of an inductor (second inductor 22b) is also taken into a second gate driving circuit 18d that controls the second power semiconductor device 11b located on the lower-arm side. Components identical or equivalent to those in the second embodiment illustrated in FIG. 3 are denoted by the same reference symbols, and redundant details are omitted as appropriate.

Figure 6:
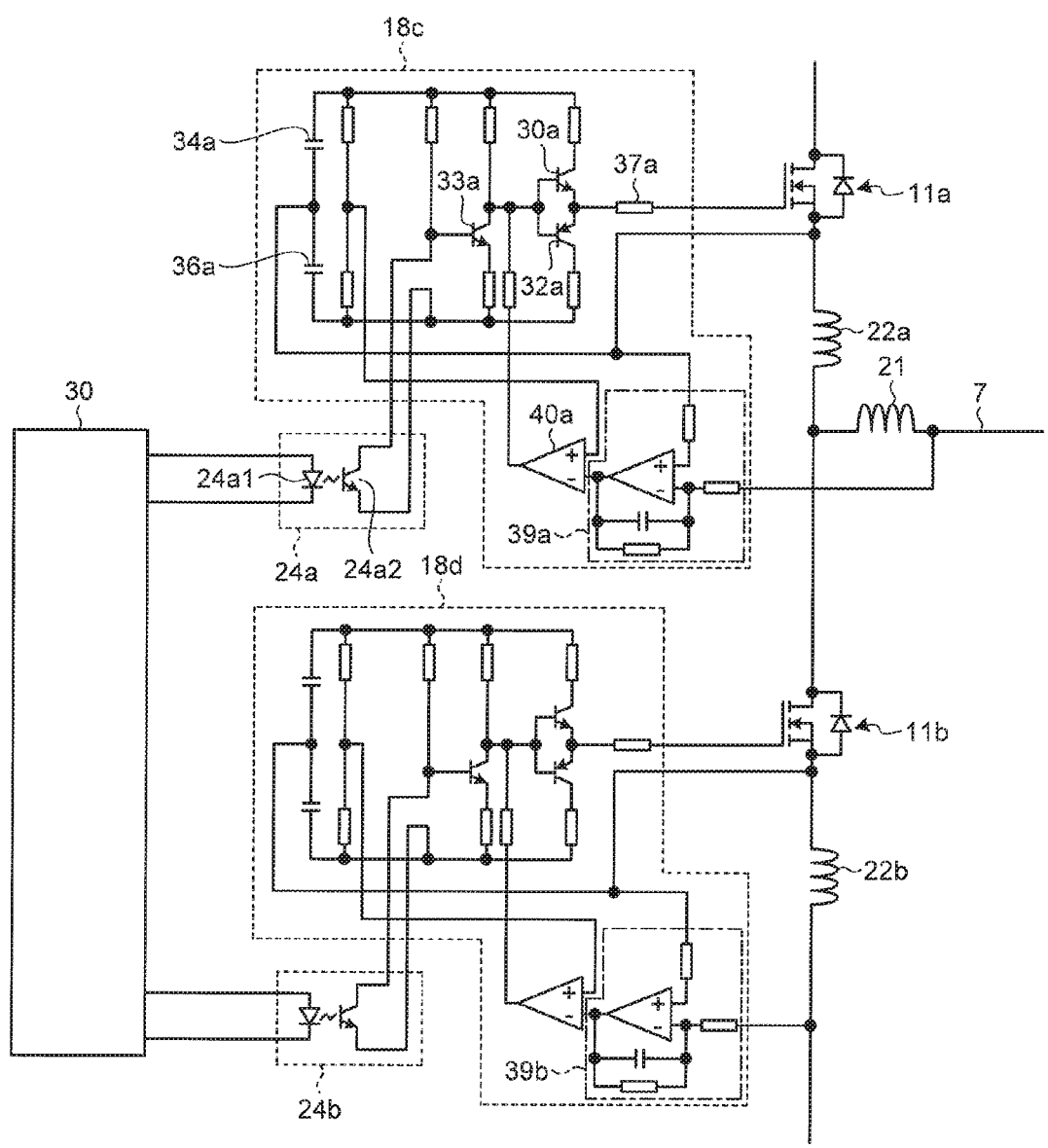
FIG. 6 is a diagram illustrating a detailed circuit configuration of first and second gate driving circuits according to the third embodiment.

FIG. 6 is a diagram illustrating a detailed circuit configuration of first and second gate driving circuits (18c, 18d) according to the third embodiment. FIG. 6 also illustrates connections to first and second power semiconductor devices (11a, 11b) that are peripheral circuit components, and the U-phase output inductor 21 and first and second inductors (22a, 22b) that are circuit elements. As illustrated in FIG. 6, the first gate driving circuit 18c and the second gate driving circuit 18d have the same circuit configuration. However, the voltage across the U-phase output inductor 21 and first inductor 22a is inputted to the first gate driving circuit 18c as with the configuration in FIG. 4, whereas a voltage across the second inductor 22b is inputted to the second gate driving circuit 18d.

The first gate driving circuit 18c processes the voltage developed across the U-phase output inductor 21 and first inductor 22a by a time integration circuit 39a using an operational amplifier. Since the voltage developed across the U-phase output inductor 21 and first inductor 22a represents the time rate of change in flowing current, the output of the time integration circuit 39a represents the value of a current flowing through both the U-phase output inductor 21 and the first inductor 22a (flowing current value).

That is, the first gate driving circuit 18c can know the value of the current flowing through the U-phase output inductor 21 and first inductor 22a, and can perform abnormality determination and protection control based on the current value.

The second gate driving circuit 18d processes the voltage developed across the second inductor 22b by a time integration circuit 39b using an operational amplifier. Since the voltage developed across the second inductor 22b represents a time rate of change in a flowing current, an output of the time integration circuit 39b represents a value of a current flowing through the second inductor 22b (flowing current value).

That is, the second gate driving circuit 18d can know the flowing current value of the second inductor 22b, and can perform abnormality determination and protection control based on the current value.

In the configuration of the third embodiment, a difference between the inductance value of the first inductor 22a and the inductance value of the second inductor 22b is preferably 20% or less. The reason is as follows.

Approximate variations of components typically used in a gate driving circuit are 20% for electrolytic capacitors, 10% for ceramic capacitors, and 5% for resistors. Therefore, designing using the variation value of the electrolytic capacitors having the largest numerical value as the range of variations of the inductance value of the first inductor 22a and the inductance value of the second inductor 22b can communalize the component values between the first gate driving circuit 18c and the second gate driving circuit 18d. When the component values can be communalized, a circuit can be built up without selecting specific components, so that component management is facilitated, resulting in an advantageous effect of allowing reductions in component management and manufacturing cost.

As described above, according to the power converter according to the third embodiment, in a power converter having at least one bridge circuit configured to have upper and lower arms in which a first power semiconductor device and a second power semiconductor device are connected in series, a first gate driving circuit that supplies a charge to the first power semiconductor device of an upper arm to drive the device monitors a third voltage representing a total value of a first voltage developed by a first inductor located on a path of a current flowing through the first power semiconductor device, and a second voltage developed by an output inductor between a connection end between the first power semiconductor device and the second power semiconductor device, and a load, and performs control to protect the first power semiconductor device based on a value of the monitored voltage, while a second gate driving circuit that supplies a charge to the second power semiconductor device of a lower arm to drive the device monitors a fourth voltage developed by a second inductor located on a path of a current flowing through the second power semiconductor device, and performs control to protect the second power semiconductor device based on a value of the monitored voltage. Accordingly, an advantageous effect is exerted in which a short-circuit abnormality such as the flow of an excessive short-circuit current can be detected to protect the first and second power semiconductor devices, and a delay time until the conduction of a short-circuit current is eliminated can be made shorter.

It is preferable that the fourth voltage developed by the second inductor be time-integrated. By time-integrating the fourth voltage representing a dI/dt component, a value of the current can be estimated, thus resulting in an effect of allowing protection focusing on the current value.

Further, in the power converter according to the third embodiment, the first voltage developed by the first inductor located on the path of a current flowing through the first power semiconductor device and the fourth voltage developed by the second inductor located on the path of a current flowing through the second power semiconductor device are used for the determination of a short-circuit abnormality, so that it is possible to detect even a short-circuit abnormality in which a short-circuit current flows through the first power semiconductor device but does not flow through the second power semiconductor device, and on the other hand a short-circuit abnormality in which a short-circuit current flows through the second power semiconductor device but does not flow through the first power semiconductor device.

Fourth Embodiment

Figure 7:
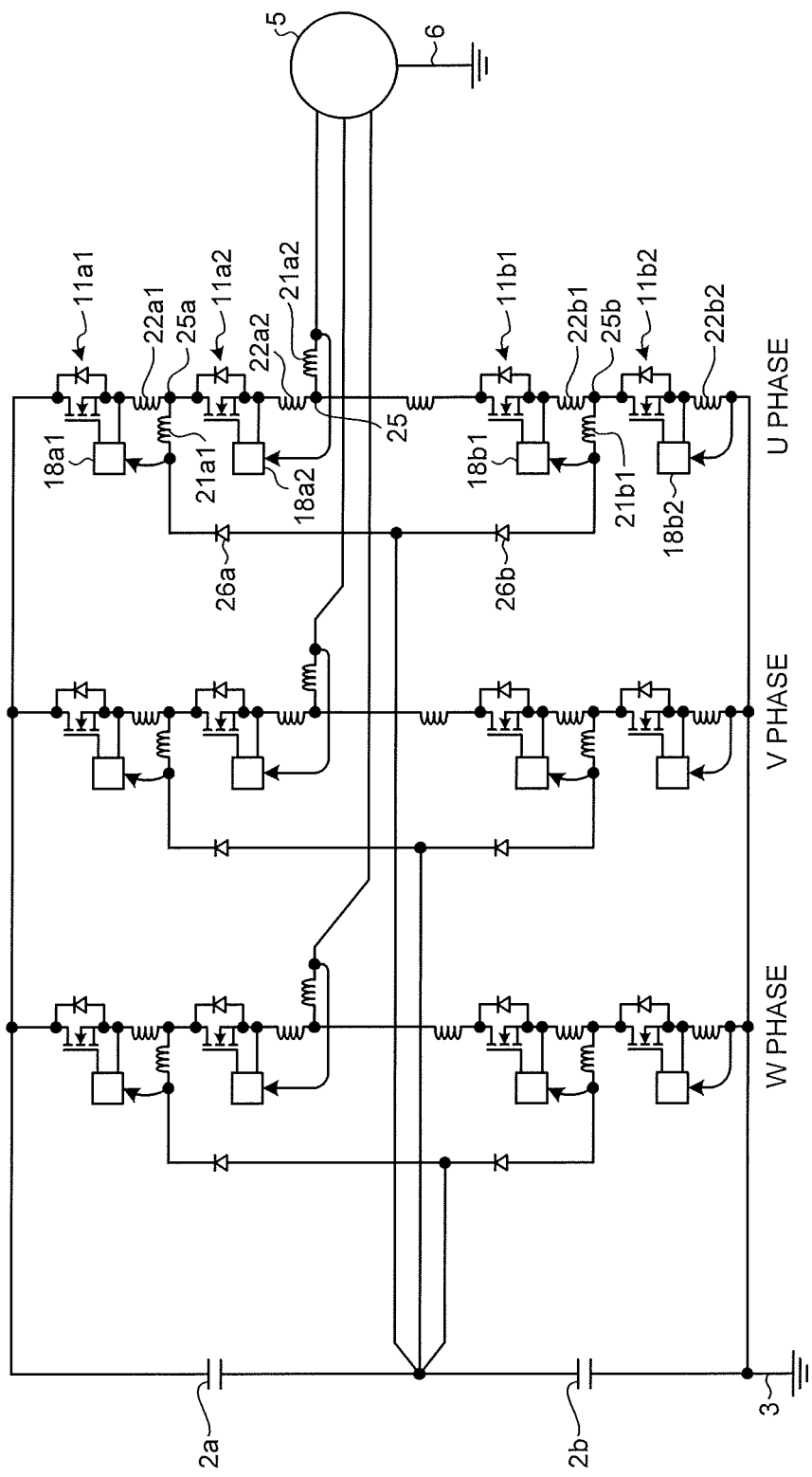
FIG. 7 is a diagram illustrating a configuration example of an application to a clamping diode type three-phase three-level circuit.
Figure 8:
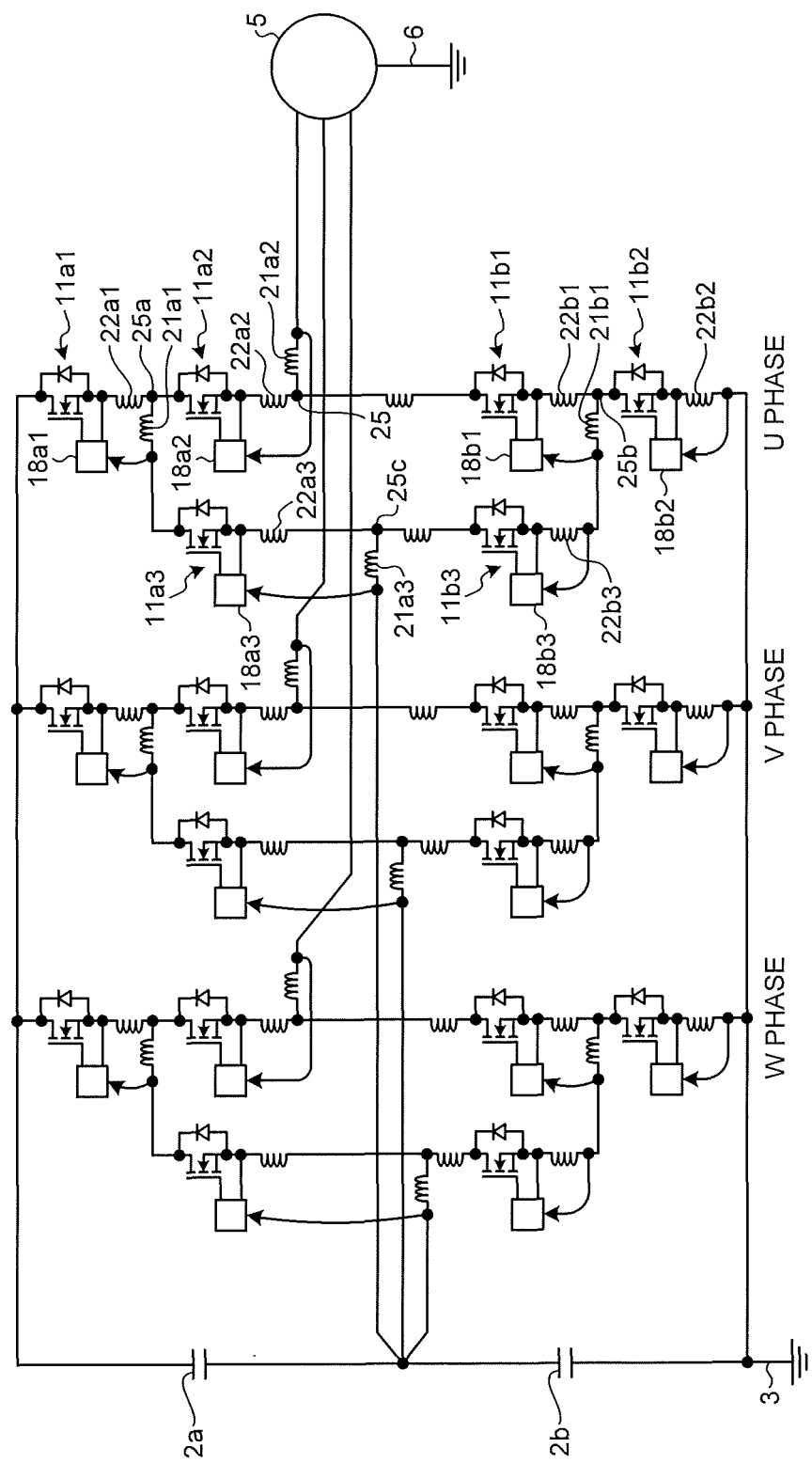
FIG. 8 is a diagram illustrating a configuration example of an application to a synchronous rectification type three-phase three-level circuit.

In the first to third embodiments, applications to a power converter with three-phase two-level circuits have been illustrated. In a fourth embodiment, applications to a power converter with three-phase three-level circuits will be described with reference to FIGS. 7 and 8. FIG. 7 is a diagram illustrating a configuration example of an application to a power converter with a clamping diode type three-phase three-level circuit. FIG. 8 is a diagram illustrating a configuration example of an application to a power converter with a synchronous rectification type three-phase three-level circuit. The configurations of the clamping diode type three-phase three-level circuit and the synchronous rectification type three-phase three-level circuit are publicly known, and therefore will not be described. As with the case of the three-phase two-level, the configurations of the three phases are identical or equivalent. Thus the following description focuses on a U phase for explanation.

In FIG. 7, an upper-level side first power semiconductor device $11a1$, a lower-level side first power semiconductor device $11a2$ and an upper-level side clamping diode $26a$ constitute an upper arm, and an upper-level side second power semiconductor device $11b1$, a lower-level side second power semiconductor device $11b2$ and a lower-level side clamping diode $26b$ constitute a lower arm. A connection end between the lower-level side first power semiconductor device $11a2$ and the upper-level side second power semiconductor device $11b1$ is a connection end $25$, a connection end between the upper-level side first power semiconductor device $11a1$ and the lower-level side first power semiconductor device $11a2$ is a connection end $25a$, and a connection end between the upper-level side second power semiconductor device $11b1$ and the lower-level side second power semiconductor device $11b2$ is a connection end $25b$.

An upper-level side first inductor $22a1$ is illustrated between the upper-level side first power semiconductor device $11a1$ and the lower-level side first power semiconductor device $11a2$, a lower-level side first inductor $22a2$ is illustrated between the connection end $25$ and the lower-level side first power semiconductor device $11a2$, an upper-level side second inductor $22b1$ is illustrated between the upper-level side second power semiconductor device $11b1$ and the lower-level side second power semiconductor device $11b2$, and a lower-level side second inductor $22b2$ is illustrated between the lower-level side second power semiconductor device $11b2$ and the negative electrode of a direct-current capacitor $2b$.

A U-phase output inductor $21a2$ is illustrated between the connection end $25$ and the induction motor $5$, an upper-level side third inductor $21a1$ is illustrated between the connection end $25a$ and a cathode of the upper-level side clamping diode $26a$, and a lower-level side third inductor $21b1$ is illustrated between the connection end $25b$ and an anode of the lower-level side clamping diode $26b$.

In this embodiment, as the upper-level side first inductor $22a1$, the lower-level side first inductor $22a2$, the upper-level side second inductor $22b1$, the lower-level side second inductor $22b2$, the U-phase output inductor $21a2$, the upper-level side third inductor $21a1$, and the lower-level side third inductor $21b1$, parasitic inductances inherent in in-module wiring lines or out-of-module wiring lines are used. The use of the parasitic inductances has an advantage in that coils are not required to be provided individually.

A first gate driving circuit $18a1$ is connected to a first control gate terminal and a first control source terminal in the upper-level side first power semiconductor device $11a1$, and supplies a charge to the upper-level side first power semiconductor device $11a1$ to drive the upper-level side first power semiconductor device $11a1$. Another first gate driving circuit $18a2$ is connected to a first control gate terminal and a first control source terminal in the lower-level side first power semiconductor device $11a2$, and supplies a charge to the lower-level side first power semiconductor device $11a2$ to drive the lower-level side first power semiconductor device $11a2$. A second gate driving circuit $18b1$ is connected to a second control gate terminal and a second control source terminal in the upper-level side second power semiconductor device $11b1$, and supplies a charge to the upper-level side second power semiconductor device $11b1$ to drive the upper-level side second power semiconductor device $11b1$. A second gate driving circuit $18b2$ is connected to a second control gate terminal and a second control source terminal in the lower-level side second power semiconductor device $11b2$, and supplies a charge to the lower-level side second power semiconductor device $11b2$ to drive the lower-level side second power semiconductor device $11b2$.

Voltage developed across the upper-level side first inductor $22a1$ and upper-level side third inductor $21a1$ is inputted to the first gate driving circuit $18a1$. The circuit configuration of the first gate driving circuit $18a1$ is identical or equivalent to that of the first gate driving circuit $18c$ illustrated in FIG. 4 or FIG. 6. By processing the voltage developed across the upper-level side first inductor $22a1$ and upper-level side third inductor $21a1$ by the time integration circuit $39a$ using an operational amplifier, a value of a current flowing through the upper-level side first inductor $22a1$ and the upper-level side third inductor $21a1$ (flowing current value) can be grasped, and abnormal determination and protection control based on the current value can be performed.

The first gate driving circuit $18a2$, the second gate driving circuit $18b1$ and the second gate driving circuit $18b2$ operate in the same manner, and will not be described.

On the power converter with the synchronous rectification type three-phase three-level circuit, basic concept is the same. In the power converter with the synchronous rectification type three-phase three-level circuit, as illustrated in FIG. 8, an upper-level side third power semiconductor device $11a3$ is provided in place of the upper-level side clamping diode $26a$, and a lower-level side third power semiconductor device $11b3$ is provided in place of the lower-level side clamping diode $26b$.

When a connection end between the upper-level side third power semiconductor device $11a3$ and the lower-level side third power semiconductor device $11b3$ is a connection end $25c$, an upper-level side third inductor $22a3$ is illustrated between the connection end $25c$ and the upper-level side third power semiconductor device $11a3$, a lower-level side third inductor $22b3$ is illustrated between an end of the third inductor $21b1$ and the lower-level side third power semiconductor device $11b3$, and a U-phase input inductor $21a3$ is illustrated between the connection end $25c$ and the positive electrode of a direct-current capacitor $2b$ (the negative electrode of $2a$).

As the upper-level side third inductor $22a3$, the lower-level side third inductor $22b3$ and the U-phase input inductor $21a3$, parasitic inductances inherent in in-module wiring lines or out-of-module wiring lines are used. The use of the parasitic inductances has an advantage in that coils are not required to be provided individually.

A third gate driving circuit $18a3$ is connected to a third control gate terminal and a third control source terminal in the upper-level side third power semiconductor device $11a3$, and supplies a charge to the upper-level side third power semiconductor device $11a3$ to drive the upper-level side third power semiconductor device $11a3$. A fourth gate driving circuit $18b3$ is connected to a third control gate terminal and a third control source terminal in the lower-level side third power semiconductor device 11b3, and supplies a charge to the lower-level side third power semiconductor device 11b3 to drive the lower-level side third power semiconductor device 11b3.

A voltage developed across the upper-level side third inductor 22a3 and U-phase input inductor 21a3 is inputted to the third gate driving circuit 18a3. A voltage developed across the lower-level side third inductor 22b3 is inputted to the fourth gate driving circuit 18b3. The circuit configurations of the third gate driving circuit 18a3 and the fourth gate driving circuit 18b3 are identical or equivalent to that of the first gate driving circuit 18c illustrated in FIG. 4 or FIG. 6.

In the third gate driving circuit 18a3, by processing a voltage developed across the upper-level side third inductor 22a3 and the U-phase input inductor 21a3 by the time integration circuit 39a using an operational amplifier, a value of a current flowing through the upper-level side third inductor 22a3 and the U-phase input inductor 21a3 (flowing current value) can be grasped, and abnormal determination and protection control based on the current value can be performed.

In the fourth gate driving circuit 18b3, by processing a voltage developed across the lower-level side third inductor 22b3 by the time integration circuit 39a using an operational amplifier, a value of a current flowing through the lower-level side third inductor 22b3 (flowing current value) can be grasped, and abnormal determination and protection control based on the current value can be performed.

The configurations illustrated in the above first to fourth embodiments are examples of the configuration of the present invention, and may be combined with another known technique, or may be configured with a change such as an omission of a part without departing from the scope of the present invention as a matter of course.

INDUSTRIAL APPLICABILITY

As above, the present invention is useful for a power converter capable of detecting short-circuit abnormality and protecting power semiconductor devices.

REFERENCE SIGNS LIST 1 power converter, 2, 2a, 2b direct-current capacitor, 3, 6 ground line, 5 induction motor, 7 U-phase output line, 8 V-phase output line, 10a, 10b 1 in 1 module, 10c 2 in 1 module, 11a first power semiconductor device, 11a1 upper-level side first power semiconductor device, 11a2 lower-level side first power semiconductor device, 11a3 upper-level side third power semiconductor device, 11b second power semiconductor device, 11b1 upper-level side second power semiconductor device, 11b2 lower-level side second power semiconductor device, 11b3 lower-level side third power semiconductor device, 12a first main current drain terminal, 12b second main current drain terminal, 13a first main current source terminal, 13b second main current source terminal, 13c load connection terminal, 14a first control gate terminal, 14b second control gate terminal, 15a first control source terminal, 15b second control source terminal, 18a, 18a1, 18a2, 18c, 18d first gate driving circuit, 18b1, 18b2, 18d second gate driving circuit, 18a3 third gate driving circuit, 18b3 fourth gate driving circuit, 19 gate driving circuit, 20, 21, 21a2 U-phase output inductor, 21a1 upper-level side third inductor, 21b1 lower-level side third inductor, 21a3 U-phase input inductor, 22a first inductor, 22b second inductor, 22a1 upper-level side first inductor, 22a2 lower-level side first inductor, 22b1 upper-level side second inductor, 22b2 lower-level side second inductor, 22a3 upper-level side third inductor, 22b3 lower-level side third inductor, 24a, 24b signal isolator, 25, 25a, 25b, 25c connection end, 26a upper-level side clamping diode, 26b lower-level side clamping diode, 28 V-phase output inductor, 30 controller, 30a on transistor, 32a off transistor, 33a transistor, 34a on capacitor, 36a off capacitor, 37a gate resistor, 38a differential amplification circuit, 39a time integration circuit, 39b time integration circuit, 40a comparator, 24a1 photodiode, 24a2 phototransistor

The invention claimed is:

1. A power converter including at least one bridge circuit configured to have upper and lower arms in which a first power semiconductor device and a second power semiconductor device are connected in series, the power converter comprising:
   a first gate driving circuit connected to a first control gate terminal and a first control source terminal in the first power semiconductor device, to supply a charge to the first power semiconductor device to drive the first power semiconductor device; and
   a second gate driving circuit connected to a second control gate terminal and a second control source terminal in the second power semiconductor device, to supply a charge to the second power semiconductor device to drive the second power semiconductor device, wherein
   a first main current source terminal of the first power semiconductor device is connected to a second main current drain terminal of the second power semiconductor device, and an end of the connection is connected to a load by an output line, and
   the first gate driving circuit monitors a first voltage developed by an output inductor between the connection end and the load, and performs control to protect the first power semiconductor device based on a value of the monitored voltage.

2. The power converter according to claim 1, wherein the first gate driving circuit includes a differential amplifier, estimates a value of a current flowing through the output line based on the first voltage, and performs control to protect the first power semiconductor device based on the estimated current value.

3. The power converter according to claim 1, wherein the first power semiconductor device and the second power semiconductor device are sealed in different casings, respectively, and the output inductor is a parasitic inductance of the output line.

4. The power converter according to claim 1, wherein the first power semiconductor device and the second power semiconductor device are sealed in a single casing, and the output inductor is a parasitic inductance obtained by a line inside the casing.

5. The power converter according to claim 1, wherein the first power semiconductor device and the second power semiconductor device are sealed in a single casing, and the output inductor is a parasitic inductance of an output line disposed outside the casing.

6. The power converter according to claim 1, wherein the first power semiconductor device and the second power semiconductor device are sealed in a single casing, and the output inductor is a combined inductance component of a parasitic inductance obtained by an output line inside the casing and a parasitic inductance of an output line disposed outside the casing.

7. A power converter including at least one bridge circuit configured to have upper and lower arms in which a first power semiconductor device and a second power semiconductor device are connected in series, the power converter comprising:
- a first gate driving circuit connected to a first control gate terminal and a first control source terminal in the first power semiconductor device, to supply a charge to the first power semiconductor device to drive the first power semiconductor device; and
- a second gate driving circuit connected to a second control gate terminal and a second control source terminal in the second power semiconductor device, to supply a charge to the second power semiconductor device to drive the second power conductor device, wherein
- a first main current source terminal of the first power semiconductor device is connected to a second main current drain terminal of the second power semiconductor device, and an end of the connection is connected to a load by an output line, and
- the first gate driving circuit monitors a first voltage developed by a first inductor between the first main current source terminal and the connection end and a second voltage developed by an output inductor between the connection end and the load, and performs control to protect the first power semiconductor device based on respective values of the monitored voltages.

8. The power converter according to claim 7, wherein the first gate driving circuit monitors a third voltage representing a total value of the first voltage and the second voltage, and performs control to protect the first power semiconductor device based on a value of the monitored voltage.

9. The power converter according to claim 8, wherein the first gate driving circuit includes an integrator, estimates a value of a current flowing through the first main current source terminal by time-integrating the third voltage, and performs control to protect the first power semiconductor device based on the estimated current value.

10. The power converter according to claim 7, wherein the second gate driving circuit monitors a fourth voltage developed by a second inductor between the second control source terminal and a second main current source terminal, and performs control to protect the second power semiconductor device based on a value of the monitored voltage.

11. The power converter according to claim 10, wherein the second gate driving circuit includes an integrator, estimates a value of a current flowing through the second main current source terminal by time-integrating the fourth voltage, and performs control to protect the second power semiconductor device based on the estimated current value.

12. The power converter according to claim 10, wherein a difference in inductance value between the first inductor and the second inductor is 20% or less.

13. The power converter according to claim 10, wherein
- the first power semiconductor device is sealed in a casing and the second power semiconductor device is sealed in another different casing, and
- the first inductor is a parasitic inductance obtained by a line inside the casing, the second inductor is a parasitic inductance obtained by a line inside the casing, and the output inductor is a parasitic inductance of the output line.

14. The power converter according to claim 10, wherein
- the first power semiconductor device and the second power semiconductor device are sealed in a single casing, and
- the first inductor, the second inductor, and the output inductor are a parasitic inductance obtained by a line inside the casing.

15. The power converter according to claim 10, wherein
- the first power semiconductor device and the second power semiconductor device are sealed in a single casing, and
- the first inductor and the second inductor are a parasitic inductance obtained by a line inside the casing, and the output inductor is a combined inductance component of a parasitic inductance obtained by a line inside the casing and a parasitic inductance of the output line.

* * * * *